United States Patent [19]
Spratt et al.

[11] Patent Number: 6,027,756
[45] Date of Patent: Feb. 22, 2000

[54] METHOD FOR FORMING A BONE-IN HAM AND A HAM FORMED BY THE METHOD

[75] Inventors: Richard S. Spratt; Donald V. Julian, both of Cincinnati, Ohio

[73] Assignee: Sara Lee Corporation, Winston-Salem, N.C.

[21] Appl. No.: 09/205,578

[22] Filed: Dec. 5, 1998

Related U.S. Application Data

[63] Continuation-in-part of application No. 08/814,703, Mar. 11, 1997, abandoned.

[51] Int. Cl.⁷ .................................................... A23L 1/317
[52] U.S. Cl. ........................... 426/281; 426/282; 426/641
[58] Field of Search .................................... 426/282, 641, 426/281

[56] References Cited

U.S. PATENT DOCUMENTS

| | | | |
|---|---|---|---|
| 5,328,712 | 7/1994 | Stevison | 426/641 |
| 5,387,424 | 2/1995 | Mendenhall | 426/641 |

*Primary Examiner*—Helen Pratt
*Attorney, Agent, or Firm*—Charles Y. Lackey; Kilpatrick Stockton LLP

[57] ABSTRACT

A method of forming a natural appearing miniature bone-in ham and a miniature ham formed by the method, the method including trimming a small quantity of ham pieces to remove fat, injecting the ham pieces with a cure solution and macerating and tumbling the injected pieces for a predetermined period of time. A portion of the ham pieces are then placed into a miniature ham stuffing horn or mold, and a substitute bone is precisely positioned into the treated ham pieces by making an appropriately located incision. The balance of the ham pieces is then added to the stuffer or mold in a manner to prevent movement of the positioned substitute bone and the generation of voids. The ham and encapsulated substitute bone are then stuffed into a miniature casing or mold and cooked in a conventional manner. Once cooked, the finished miniature ham is cut in half across the substitute bone in such a way as to make two natural appearing miniature bone-in ham halves with a decidedly lower fat content than natural bone-in hams.

19 Claims, 1 Drawing Sheet

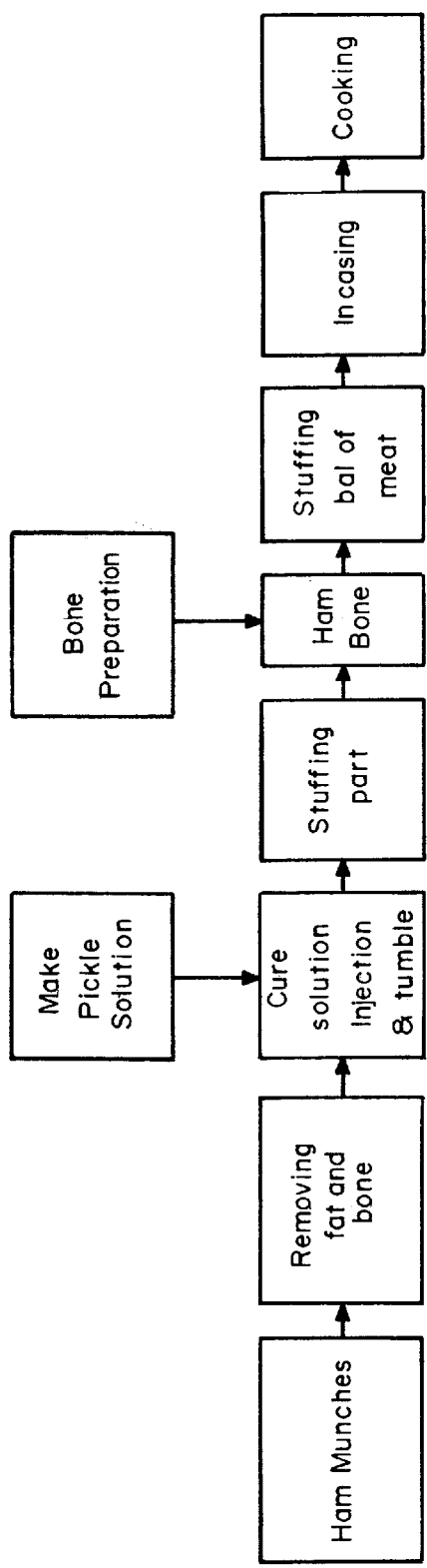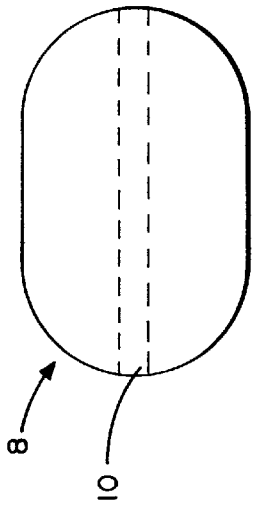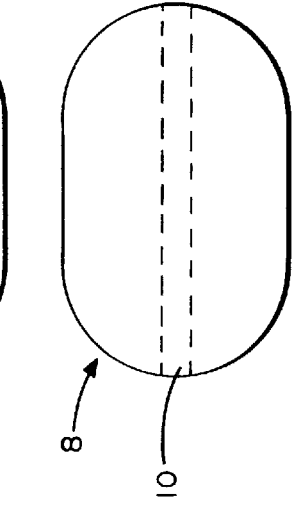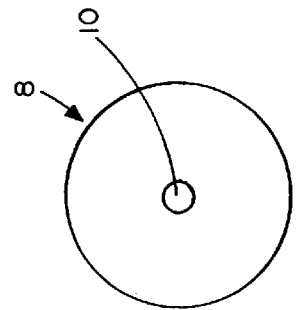

6,027,756

METHOD FOR FORMING A BONE-IN HAM AND A HAM FORMED BY THE METHOD

This is a continuation-in-part application of application Ser. No. 08/814,703 filed Mar. 11, 1997 now abandoned.

FIELD OF THE INVENTION

The present invention relates generally to a process for forming artificial bone-in hams and for the ham formed by the process and, more particularly, to a process for forming a miniature, artificial bone-in ham which has a lower fat content, a lower weight, and a smaller size than natural bone-in hams while retaining the natural appearance of a natural bone-in ham.

DESCRIPTION OF THE PRIOR ART

Natural bone hams, when cooked usually, run from about 7 pounds to 10 pounds in weight per half ham and have fat levels of from 10 to 20%. There are no small 3 to 6 pound bone-in half hams available, thus requiring the consumer to buy far more ham than desired or to settle for canned, boneless, other less desirable substitutes. Moreover, with fat levels of from 10 to 20%, natural bone-in hams far exceed the present health and consumer trend to purchase food products with lower fat content—likely a fat content of from 3 to 7%. It is to this need for a smaller bone-in ham having a lower fat content that the present invention is directed.

SUMMARY AND OBJECTIVES OF THE INVENTION

The present invention is a process for forming an artificial, miniature bone-in ham which includes the steps of processing a small quantity of ham pieces by trimming meat pieces to remove fat, injecting the pieces with a standard cure solution, and macerating and tumbling the cure injected pieces for a predetermined period of time, preferably under a vacuum. The ham pieces are selected from the major muscle group (flat or cushion) and help hold the bone in place during forming and cooking. A portion of the pieces is then placed into a standard ham stuffing horn or mold and cut to provide for the precise insertion of a simulated or substitute ham bone. The balance of the pieces are then added to the stuffer or mold in such a way to prevent excessive movement of the bone and the generation of voids. The formed bone-in ham mass is then stuffed into a casing or mold and cooked in the usual manner. Finally, the finished cooked ham is cut across the bone in such a way that two miniature bone-in hams of approximately 3 to 6 pounds each are formed.

The ham formed by the process is low in fat because of the way it has been treated and yet retains the natural appearance of a bone ham because of the physical placement of a substitute bone in a specific location among the selected major muscle ham pieces. The ham formed by the process is usable in a conventional manner and can be sliced, cubed cut, spiral sliced, or shaped in any other conventional way.

From the foregoing, it can be seen that a material object of the present invention is to provide a method for producing a natural appearance, low fat, miniature bone-in ham that results in the provision of a small bone-in half ham having a weight of from 3 to 6 pounds using standard butcher hams.

It is a further material object of the present invention to provide a small, low fat, bone-in half ham.

It is an additional object of the present invention to provide a miniature bone-in ham formed to prevent excessive movement of the bone and the generation of voids.

Yet a further object of the present invention is to provide a method for forming an artificial miniature, low fat bone-in ham that can be shaped to simulate a natural bone-in ham.

Thus, there has been outlined, rather broadly, the more important features of the invention in order that the detailed description that follows may be better understood and in order that the present contribution to the art may be better appreciated. There are obviously additional features of the invention that will be described hereinafter and which will form the subject matter of the claims appended hereto. In this respect, before explaining several embodiments of the invention in detail, it is to be understood that the invention is not limited in its application to the details and construction and to the arrangement of the components set forth in the following description or illustrated in the drawings. The invention is capable of other embodiments now being practiced and carried out in various ways.

It is also to be understood that the phraseology and terminology herein are for the purpose of description and should not be regarded as limiting in any respect. Those skilled in the art will appreciate the concept upon which this disclosure is based and that it may readily be utilized as a basis for designating other structures, methods, and systems for carrying the several purposes of the development. It is important that the claims be regarded as including such equivalent constructions insofar as they do not depart from the spirit and scope of the present invention.

So that the manner in which the above-recited features, advantages, and objects of the invention, as well as others which will become apparent, are obtained and can be understood in detail, a more particular description of the invention briefly summarized above may be had by reference to the embodiment thereof which is illustrated in the appended drawings, which drawings form a part of the specification and wherein like characters of reference designate like parts throughout the several views. It is to be noted, however, that the appended drawings illustrate only preferred and alternative embodiments of the invention and are, therefore, not to be considered limiting of its scope, as the invention may admit to additional equally effective embodiments.

BRIEF DESCRIPTION OF THE DRAWINGS

FIG. 1 is a schematic flow chart diagram of the steps of the method of the present invention;

FIG. 2 is a plan view of the natural shape artificial, miniature bone-in ham of the present invention;

FIG. 3 is a side elevational view of the natural shape bone-in ham of the present invention;

FIG. 4 is an end elevational view of the natural shape bone-in ham of the present invention;

DETAILED DESCRIPTION OF PREFERRED EMBODIMENTS

As shown schematically in FIG. 1, a plurality of ham muscles such as flats, eyes, and cushions are carefully trimmed to remove fat and then injected with a standard cure solution. These processed ham muscles are then macerated and tumbled from 1-½ hours to about 3 hours under vacuum. After the maceration and tumbling step has been completed, a portion (approximately ½) of the ham muscles are placed into a standard ham stuffing horn or a standard mold.

An actual ham bone, such as a femur ham bone, can be utilized to form the artificially inserted bone. It is preferably separated from the fibula and tibia at the elbow joint and then processed in a cover pickle solution for a period of from about 12 to 30 hours. Once the ham bone has been so treated, and often reduced in size, it is placed within a precise incision made in the major muscle, placed within the stuffer, and the balance of the macerated and tumbled muscles are positioned in the stuffer and on top of the bone in a manner to prevent excessive movement of the bone and the generation of voids. The muscles and bone are then stuffed into a casing forming a whole, but smaller than natural bone-in ham. The whole, but miniature and artificial, bone-in ham is then cooked in the usual manner.

After cooking, the ham is cut into two pieces across the bone 10 in such a way as to make two miniature half bone-in lean hams 8, each of approximately 3 to 6 pounds in weight.

Bone-in half ham 8 is consistent in texture and color and simulates a small low-fat bone half ham. Since fat has been carefully removed from the muscles prior to the maceration and tumbling steps, a fat content of from 3 to 7% is achieved which is considerably lower than natural bone hams which have fat levels of from 10 to 20%. While it is known to reshape hams to some extent for aesthetic or convenience reasons, it is heretofore unknown to position precisely a bone in a major ham muscle to form a simulated butcher ham. Other ham forming concepts are shown in, for example, U.S. Pat. No. 3,717,473. In many instances, pieces of meat are placed in plastic bags and sealed in a heated environment during which time the bag is shrunk about the pieces and the precooking sets the protein to bind the pieces together. Desired shapes of hams can be accomplished by this technique.

The present invention also contemplates the provision of a simulated or artificial bone in lieu of a real bone within the ham muscle to form the bone-in ham with various color and seasoning combinations used to treat the bone and make it more natural in appearance.

The bone-in ham comprising a portion of the present invention can be made, among other ways, on a conventional ham stuffing horn, shown generally as 12 in FIG. 5. The horn has a cylindrical chamber 14 which is a part of a continuous hollow cylindrical tube 16 mounted on a conventional support means 18. A movable piston 20 is slideably positioned in one end of tube 16, and an arcuately shaped lid 22 pivotally connects to chamber 14 to form a closure therefore.

A portion of ham muscle 24 is positioned on the bottom of the cylinder interior and is followed by an elongated bone 26 aligned in a parallel relationship with the axis of the chamber 14 and tube 16. A second portion of ham 28 is then positioned on top of first ham portion 24 and bone 26 as shown. Lid 22 is then closed, forcing the ham sections 24 and 28 to conform to the interior of the cylinder chamber and surround the bone 26. A concave portion 30 in piston 20 engages the first end of the ham sections and bone so that when pressure is applied by the piston, that end of the ham and bone combination conforms to the interior shape of recess 30. The piston then urges the ham and bone combination out of the chamber and toward the outlet portion 32 of cylinder 16. Netting (not shown) can be positioned within the interior of cylinder 16 to encompass the ham as it moves therethrough, and the pressure against the netting will generally taper the forward portion of the ham bone combination so that the final product has a ham-like appearance.

Horns like that described above are conventional and form no part of the present inventive concept.

The basic and novel characteristics of the method and articles of the present invention will be readily understood from the foregoing disclosure by those skilled in the art. It will become readily apparent that various changes and modifications may be made in the form, construction, and arrangement of the improved steps of the inventive method and product made thereby which various respective inventions are as set forth hereinabove without departing from the spirit and scope of such inventions. Accordingly, the preferred and alternative embodiments of the present invention set forth hereinabove are not intended to limit such spirit and scope in any way.

What is claimed is:

1. A method of forming an artificial, miniature bone-in ham comprising the steps of: trimming pieces of major muscle, uncooked boneless ham to remove fat; injecting the pieces of trimmed ham with a cure solution; macerating and tumbling the pieces of ham for a predetermined period of time; inserting some of the ham pieces into a stuffing horn or mold of a size less than ½ the size of a natural bone-in ham and weighing from 6 lbs–12 lbs; forming an incision in a major muscle to receive a replacement bone; placing a replacement bone substantially in the incision in the cavity opening; inserting the balance of the ham pieces into the stuffing horn and positioning the substitute bone to avoid generating excessive voids to form a bone-in ham less than ½ the size of a natural bone-in ham; removing the bone-in ham from the stuffing horn and positioning the bone-in ham in a casing; and cooking the bone-in ham.

2. The method as claimed in claim 1 further comprising the step of placing the casing covered ham into a sizing net prior to cooking.

3. The method as claimed in claim 2 further comprising the step of cutting the formed bone-in ham across the substitute bone to form at least two miniature bone-in ham halves.

4. The method as claimed in claim 3 further comprising the step of spiral slicing the miniature bone-in ham.

5. The method as claimed in claim 2 wherein the trimmed pieces of ham are macerated and tumbled for a period of from 1-½ to 2-½ hours.

6. The method as claimed in claim 2 wherein the trimmed ham pieces are macerated and tumbling under vacuum.

7. The method as claimed in claim 2 wherein the bone is placed in a pickle solution for a period of from 12 to 30 hours before insertion into the stuffing form.

8. The method as claimed in claim 2 further comprising the step of spiral slicing the cooked bone-in ham.

9. The method as claimed as claim 1 further comprising the step of slicing the bone-in ham to form miniature bone-in ham halves weighing from 3 to 6 pounds each.

10. The method as claimed in claim 1 wherein the bone is kept in a pickle solution for a period of from 12 to 30 hours before insertion into the stuffing horn.

11. The method as claimed in claim 1 wherein the trimmed pieces of ham are macerated and tumbled for a period of from 1-½ to 3 hours.

12. The method as claimed in claim 1 wherein the trimmed ham pieces are macerated and tumbled under vacuum.

13. The method as claimed in claim 12 wherein the bone is placed in a pickle solution for a period of from 12 to 30 hours before insertion into the stuffing horn.

14. The method as claimed in claim 13 wherein the trimmed pieces of ham are macerated and tumbled for a period of from 1-½ to 1-½ hours.

15. The method as claimed in claim 14 wherein the trimmed ham pieces are macerated and tumbled under vacuum.

16. The method as claimed in claim 15 further comprising the step of cutting the formed ham across the bone to form at least two miniature bone-in ham halves.

17. The method as claimed in claim 16 further comprising the step of spiral slicing the miniature bone-in hams.

18. The method as claimed in claim 16 wherein the formed ham halves weigh within the range of from 3 to 4 pounds.

19. The method as claimed in claim 1 further comprising slicing the cooked, bone-in ham.

\* \* \* \* \*

UNITED STATES PATENT AND TRADEMARK OFFICE
CERTIFICATE OF CORRECTION

| | | |
|---|---|---|
| PATENT NO. | : 6,027,756 | Page 1 of 1 |
| DATED | : February 22, 2000 | |
| INVENTOR(S) | : Richard S. Spratt, et al. | |

It is certified that error appears in the above-identified patent and that said Letters Patent is hereby corrected as shown below:

<u>Title page,</u>
Item [54] change the title to read
-- METHOD FOR FORMING A BONE-IN HAM --.

<u>Column 3,</u>
Line 41-64 should be deleted and read as follows commencing after "ham stuffing horn":

-- The horn has cylindrical chamber which is a part of a continuous hollow cylindrical tube mounted on a conventional support means. A moveable piston is slideably positioned in one end of the tube, and an arcuately shaped lid pivotally connects to chamber to form closure therefor.

A portion of ham muscle is positioned on the bottom of the cylinder interior and is followed by elongated bone aligned in a parallel relationship with the axis of the chamber and tube. A second portion of ham is then positioned on top of the first ham portion and bone. The lid is then closed, forcing the ham sections to conform to the interior of the cylinder chamber and surround the bone. A concave portion in piston engages the first end of the ham sections and bone so that when pressure is applied by the piston, that end of the ham and bone combination conforms to the interior shape of the recess. The piston then urges the ham and bone combination out of the chamber and toward the outlet portion of the cylinder. Netting can be positioned within the interior of the cylinder to encompass the ham ... --.

Signed and Sealed this

Fifth Day of March, 2002

*Attest:*

*Attesting Officer*

JAMES E. ROGAN
*Director of the United States Patent and Trademark Office*